United States Patent
Trageser

(10) Patent No.: US 8,353,656 B2
(45) Date of Patent: Jan. 15, 2013

(54) PUSHPIN RETAINING DEVICE AND METHOD OF RETAINING WITHOUT OBJECT PUNCTURE

(76) Inventor: Mark Trageser, Los Angeles, CA (US)

(*) Notice: Subject to any disclaimer, the term of this patent is extended or adjusted under 35 U.S.C. 154(b) by 196 days.

(21) Appl. No.: 11/987,322

(22) Filed: Nov. 29, 2007

(65) Prior Publication Data
US 2008/0235923 A1 Oct. 2, 2008

Related U.S. Application Data

(60) Provisional application No. 60/920,953, filed on Mar. 31, 2007.

(51) Int. Cl.
A43B 23/20 (2006.01)

(52) U.S. Cl. ......... 411/439; 411/478

(58) Field of Classification Search ......... 411/396, 411/400, 439, 480, 485, 478; 24/360, 377, 24/457, 710.6, 706.2, 708.7, 708.8, 707.9, 24/708.1, 710.9, 711.2, 711.3, 711.4; 248/497, 248/218.3, 216.1, 218.1, 217.3, 304, 305; 211/106, 106.11
See application file for complete search history.

(56) References Cited

U.S. PATENT DOCUMENTS

| | | | | |
|---|---|---|---|---|
| 213,007 A * | 3/1879 | Thayer | ......... | 24/706.2 |
| 533,992 A * | 2/1895 | Lewis | ......... | 24/708.8 |
| 551,906 A * | 12/1895 | Mokeand et al. | ......... | 24/708.5 |
| 988,809 A * | 4/1911 | Peter | ......... | 24/360 |
| 1,187,764 A * | 6/1916 | Morden | ......... | 24/360 |
| 1,540,531 A * | 6/1925 | Boswell | ......... | 24/707.9 |
| 1,693,875 A | 12/1928 | Tanaka | | |
| 1,841,061 A * | 1/1932 | Sarkisian | ......... | 24/360 |
| 2,477,723 A * | 8/1949 | Crandall | ......... | 24/709.8 |
| 2,551,063 A * | 5/1951 | Sneirson | ......... | 24/710.1 |
| 2,823,436 A * | 2/1958 | Karalus | ......... | 24/706.2 |
| 2,941,269 A * | 6/1960 | Keller | ......... | 24/709.8 |
| 3,293,712 A * | 12/1966 | Mark | ......... | 24/710.1 |
| 5,507,459 A | 4/1996 | Kiera | | |
| 6,196,782 B1 | 3/2001 | Wagner et al. | | |

FOREIGN PATENT DOCUMENTS

| | | |
|---|---|---|
| FR | 1001085 A | 2/1952 |
| GB | 546159 A | 4/1941 |
| JP | 1934002452 Y | 3/1934 |
| JP | 53-83233 | 7/1976 |
| JP | 3-98099 U | 10/1991 |
| JP | 2002362094 A | 12/2002 |
| JP | 3116575 U | 11/2005 |

OTHER PUBLICATIONS

Office Action of corresponding European Application No. 08725349.8-2304. Japanese Office Action dated Oct. 9, 2012, as issued in the corresponding Japanese Patent Application No. 2010-502071, filed Sep. 30, 2009 (no English translation).

\* cited by examiner

*Primary Examiner* — Roberta Delisle
(74) *Attorney, Agent, or Firm* — Maier & Maier PLLC

(57) ABSTRACT

In accordance with at least one exemplary embodiment, a pushpin retaining device is disclosed. An exemplary pushpin retaining device can include a resilient, elongated pin that can have a first end portion for puncturing and a second end portion. A grip foot can be operatively associated with the second end portion of the pin. Alternatively, a cut edge can be on the second end portion of the pin. A method of retaining objects without object puncture can include providing a pushpin retaining device. The method can also include puncturing a support surface with an end of the pin of the pushpin device and pressing a portion of an object against the support surface with the grip foot or cut edge, respectively.

4 Claims, 21 Drawing Sheets

PUSHPIN RETAINING DEVICE AND METHOD OF RETAINING WITHOUT OBJECT PUNCTURE

CROSS REFERENCE TO RELATED APPLICATIONS

This application claims priority, under 35 U.S.C. §119(e), to U.S. Provisional Patent Application Ser. No. 60/920,953, filed Mar. 31, 2007, the disclosure of which is incorporated by reference herein in its entirety.

BACKGROUND

Thumbtacks and pushpins (a.k.a. map pins) are widely used to hang objects, including planar and non-planar objects, onto suitable support surfaces. Planar objects include various types of paper items, such as documents, posters, photographs, cardstock, paper labels, paintings and the like. Other planar objects include textile items such as cloth samples, cloth labels and the like. Certain non-planar objects are often hung by thumbtacks and pushpins, including various objects on hangers, lightweight toys, clothing items and accessories, various samples, protective cases housing other objects and the like. Indeed, the list of planar and non-planar objects goes on. Suitable support surfaces include foamboard, corkboard, particleboard, drywall, plaster and like surfaces puncturable by thumbtacks and pushpins. For example, support surfaces such as bulletin boards and cubicle walls (typically fabric-coated foamboard) are often used in combination with thumbtacks and pushpins to affix objects to such surfaces.

Conventional thumbtacks and pushpins consist of a head and a pin. By applying a lower pressure across the head of a thumbtack or pushpin positioned against a surface, a relatively higher pressure results at the tip of the pin. If the surface is a suitable support surface, then the pin will puncture the surface. When a puncturable object is placed between the tip and the support surface, the object is also punctured. The head of the thumbtack or pushpin acts as a stopper if the pin is pressed towards full engagement with or through the support surface. When this occurs, a portion of the punctured object is pressed between the head and the support surface.

Objects held as such are often prone to tearing stresses at the point of puncture due to a loose or loosening hold, or even despite a firm hold, depending on the properties (weight, material, shape, etc.), of the held object. To avoid puncturing the object as is often desirable, the pin is often made to puncture the support surface outside the bounds of an object, and a portion of the object can be pressed between the head and the support surface. This method is often used to trap an edge of a planar object between the head and the support surface. As opposed to puncturing the object, this method is more prone to retaining failure. Nevertheless, it has been employed to avoid puncturing an object and to avoid later tearing at a puncture point.

T-pins are another type of device often used to hang objects. Moreover, various clips are used for fastening one object to another. A variety of specialty hanging clips that are designed to be affixed or otherwise associated with a support surface for holding objects are also known.

SUMMARY

According to at least one embodiment, a pushpin device for retaining objects can include a resilient, elongated pin that can have a first end portion and a second end portion. The first end portion can be for puncturing. A grip foot can be operatively associated with the second end portion of the pin.

In another exemplary embodiment, a method of retaining objects without object puncture can include providing a pushpin device. The pushpin device can be characterized by a resilient, elongated pin and a grip foot. The method can also include puncturing a support surface with an end of the pin and pressing a portion of an object against the support surface with the grip foot.

In yet another exemplary embodiment, a pushpin device for retaining objects can include a resilient, elongated pin that can have a pin body bounded by a first end portion and a second end portion. The pin body can also have one or more bends. A puncture tip can be on the first end portion. A cut edge can be on the second end portion where the cut edge can abut a portion of an object in a non-punctured relationship when in use.

BRIEF DESCRIPTION OF THE FIGURES

Advantages of embodiments of the present invention will be apparent from the following detailed description of the exemplary embodiments thereof, which description should be considered in conjunction with the accompanying drawings in which.

DETAILED DESCRIPTION

Figure 1:
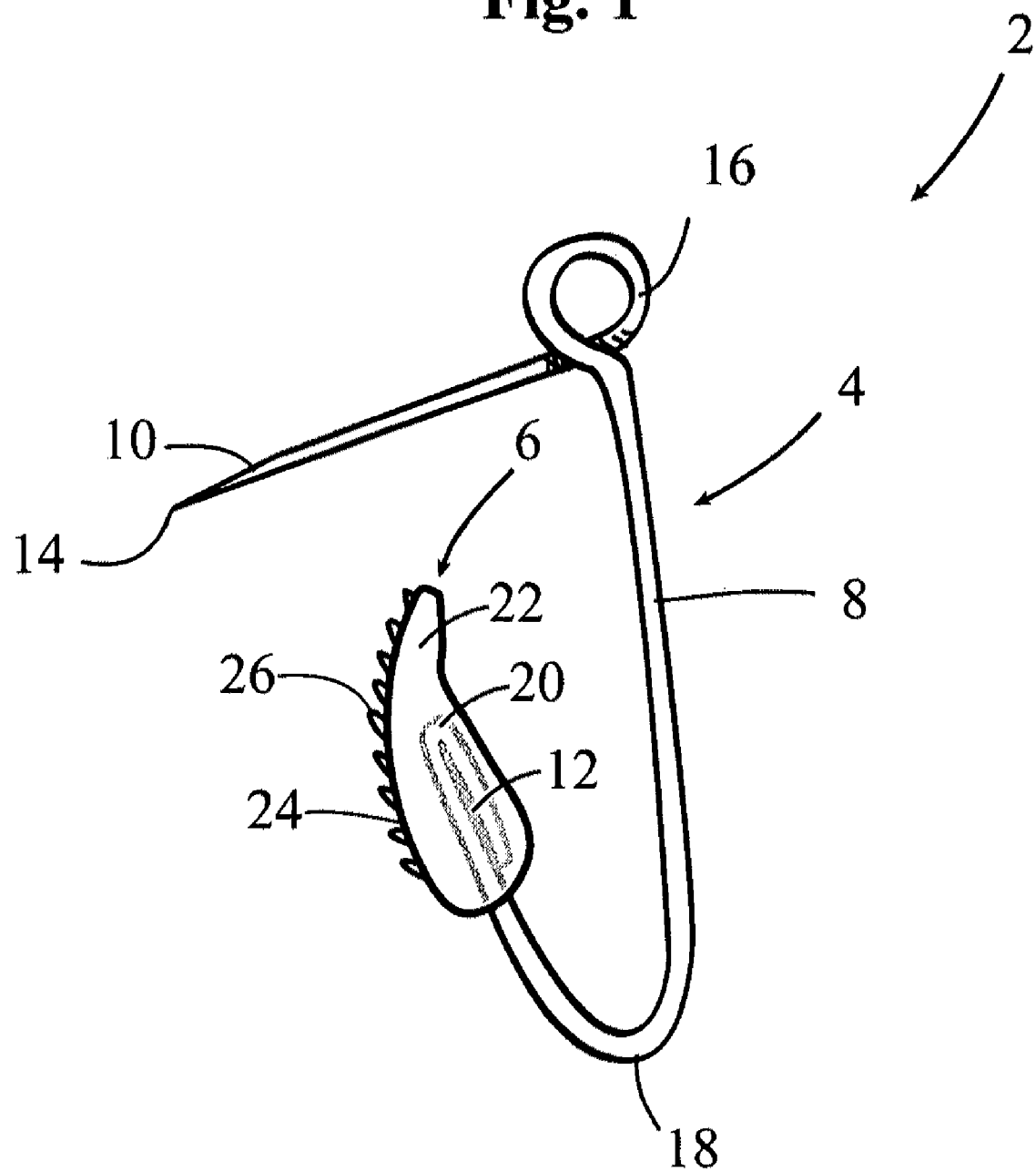
FIG. 1 is a side view of an exemplary pushpin retaining device.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the terms "embodiments of the invention", "embodiment" or "invention" do not require that all embodiments of the invention include the discussed feature, advantage or mode of operation.

Similar to conventional thumbtacks and pushpins, a pushpin retaining device according to at least one exemplary embodiment can retain various planar and non-planar objects. Likewise, exemplary pushpin retaining devices can be used with various support surfaces puncturable by a pin. The relatively simple designs of exemplary pushpin retaining devices may allow them to be mass produced in a cost-effective manner. Exemplary pushpin retaining devices may be sold in bulk like conventional thumbtacks and pushpins. Exemplary pushpin retaining devices may be constructed in numerous sizes and with varying durability as will appreciated by one having ordinary skill in the art.

Referring to FIGS. 1-5, a pushpin retaining device in accordance with at least one exemplary embodiment is shown. Pushpin retaining device 2 can have a pin 4 operatively associated with a grip foot 6. Pin 4 can be made of metal, plastic and the like known to one having ordinary skill in the art. In at least one exemplary embodiment, pin 4 can made of steel.

Grip foot 6 can be made of plastic, rubber, metal and the like known to one having ordinary skill in the art. In at least one exemplary embodiment, grip foot 6 can be made of molded plastic by any conventional molding processes. Grip foot 6 can be soft, pliable, supple, spongy and the like in consistency.

Pin 4 can be elongated and resilient; for example, it may be elongated as compared to pins of conventional thumbtacks and pushpins. Pin 4 can also be nonlinear. In addition to serving as a pin, pin 4 can serve as a spring due to resiliency that may be present from the chosen material of construction and configuration. For example, in the configuration shown in FIGS. 1-5, pin 4 may be made of a metal such as steel and thus could be resilient to serve as a spring.

Pin 4 can be characterized by pin body 8 bounded by first end portion 10 and second end portion 12. Pin body 8 can be elongated and nonlinear. On first end portion 10, puncture tip 14 can be formed. Puncture tip 14 can be used to puncture a support surface. Puncture tip 14 can be pointed or blunt. As shown, puncture tip 14 is a pointed tip.

Alternatively, in at least one exemplary embodiment, the attachment end can be threaded so that the retaining device can be screwed into a support surface. Moreover, the attachment end can be designed so as to be nailed into a support surface. A variety of other attachment ends can also be employed in embodiments, which may allow for substantially permanent or nonpermanent attachment to a support surface. Further, pushpin retaining devices according to at least one exemplary embodiment can be designed for various support surfaces, which conventional thumbtacks and pushpins may not be suitable for.

Referring to pin body 8, spring loop 16 can be formed. Spring loop 16 can provide additional spring functionality to pin 4 and to pushpin retaining device 2 as a whole. Spring loop 16 can also serve as a finger grip for a user to hold and press pushpin retaining device 16 into a support surface. Spring loop 16 can thus be firmly graspable by human fingers. Alternatively, an additional piece can be associated with spring loop 16 and may form a finger grip. The additional piece can be made of plastic, rubber, metal and the like. In at least one exemplary embodiment, the additional piece can be a plastic finger grip. In other exemplary embodiments discussed below, a bent portion at the same location can be an alternative to spring loop 16. (see, e.g., FIGS. 10 and 12) Moreover, one or more spring loops can be formed on pin body 8 (see, e.g., FIGS. 11 and 12).

Still referring to FIGS. 1-5, extending away from spring loop 16, pin body 8 can extend to and curve at bend 18 leading into second end portion 12. Bend 18 can cause pin body 8 to curve back on itself. In exemplary embodiments, pin body 8 can curve between 40 degrees and 180 degrees, effectuating backward bend 18, leading into second end portion 12. The degree of bend is measured from the orientation of the portion of the pin body 8 proximate bend 18 following bend 18 into second end portion 12.

Moreover, in some exemplary embodiments, bend 18 can be disposed between second end portion 12 and the midpoint of pin 4. The midpoint is determined by measuring the length of pin 4 from the boundaries formed by first end portion 10 and second end portion 12 by following the nonlinear path of pin body 8. The midpoint of this path can then be found.

At second end portion 12, which is shown as being inside of grip foot 6, securing loop 20 can be formed. Second end portion 12 can be securely fixed to or otherwise attached to grip foot 6. Grip foot 6 may have an elliptical cross sectional area that is substantially larger than a cross sectional area of second end portion 12. Grip foot 6 can have foot body 22, which can be made of molded plastic by any conventional molding processes, as one non-limiting example. Foot body 6 can securely house securing loop 20. Securing loop 20 can assist grip foot 6 in resisting any torsional forces present when in use.

Figure 2:
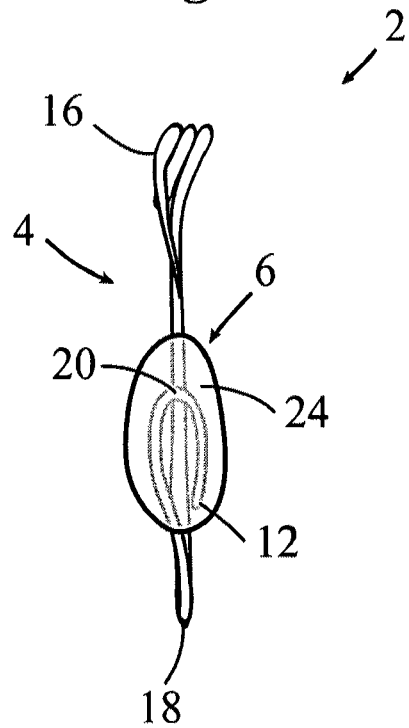
FIG. 2 is a front view of an exemplary pushpin retaining device.
Figure 3:
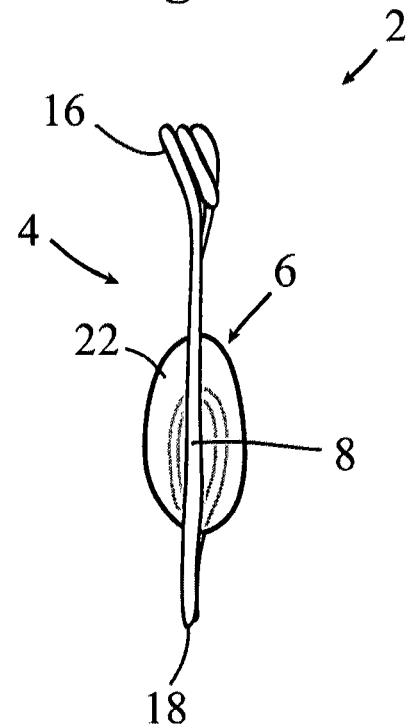
FIG. 3 is a rear view of an exemplary pushpin retaining device.
Figure 4:
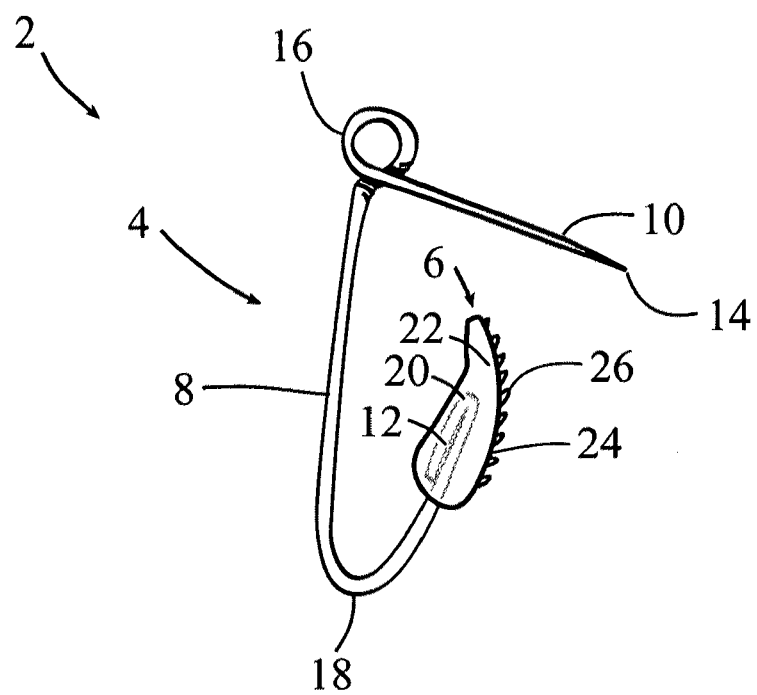
FIG. 4 is an opposite side view of an exemplary pushpin retaining device.
Figure 5:
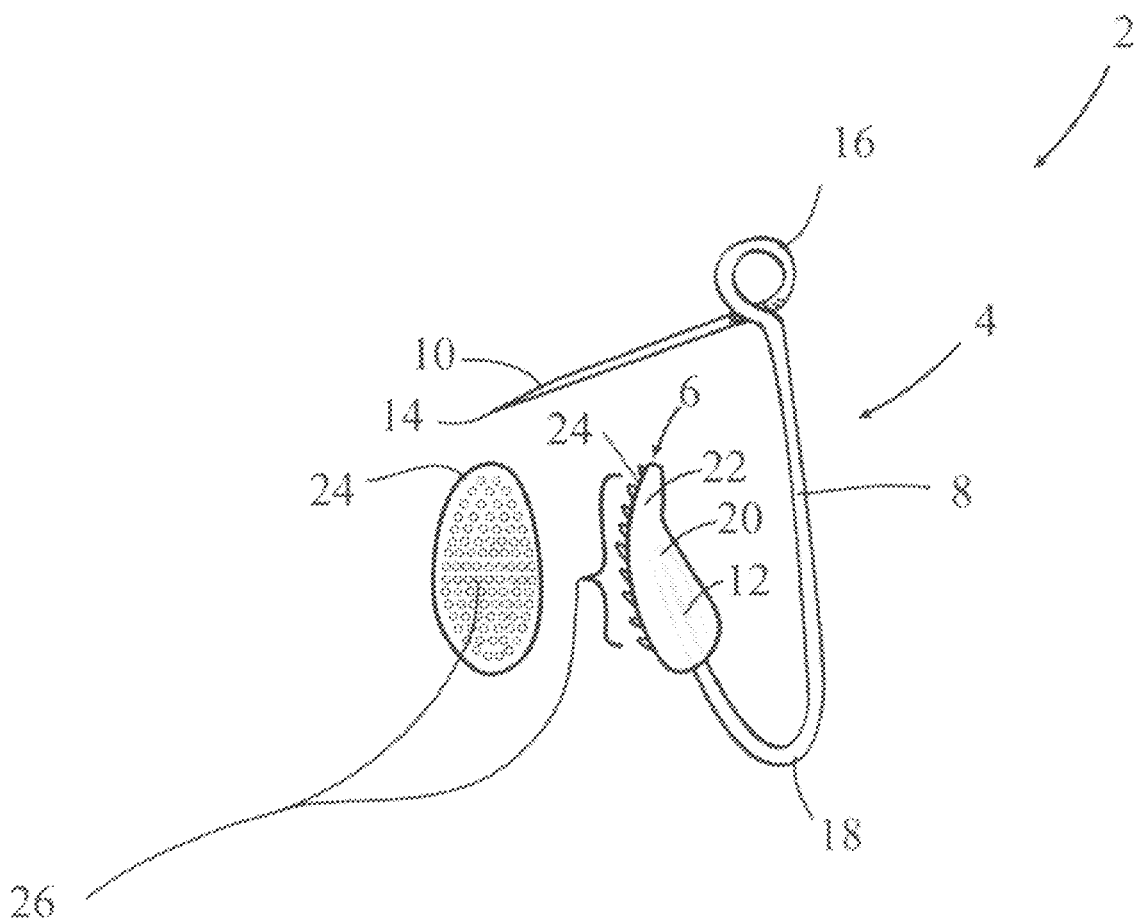
FIG. 5 is a side view of an exemplary pushpin retaining device with a split view of a foot face having a textured surface.

Grip foot 6 can include foot face 24. Face 24 can serve as a contacting face for contacting a support surface or for pressing an object against a support surface. Referring to FIG. 2, face 24 can lack purposeful texturing and thus can be substantially even. Furthermore, face 24 can be smooth. Alternatively, as shown, for example, in FIGS. 1, 4 and 5, foot face 24 can have textured surface 26. Furthermore as shown in FIGS. 2 and 3, foot face 24 of grip foot 6 may have an elliptical surface area that is substantially larger than a surface area of second end portion 12.

Textured surface 26 can be integrally formed (e.g., molded) on face 24. Alternatively, a separate piece having a textured surface 26 can be applied to or otherwise attached to face 24. During gripping engagement, textured surface 26 can increase traction between face 24 when contacting an object or a support surface in use. Textured surface 26 can have a raised texture, which may be in a pattern. Alternatively, singularly or in conjunction, the texture can be rough, grainy, scabrous and the like.

In at least one exemplary embodiment, pushpin retaining device 2 can have a height between about 0.5" and 2" as measured from the bottom of bend 18 to the top of spring loop 16 (e.g., 0.5", 0.8" and 2"). Additionally, pushpin device can have a width between about 0.4" and 1" as measured from the end of puncture tip 14 to the furthest portion of pin body 8 (e.g., 0.4", 0.6" and 1"). The diameter of pin body 8 can be between about 0.02" and 0.045" (e.g., 0.02", 0.025" and 0.045"). The diameter of the loop of spring loop 16 can be between about 0.125" and 0.3" (e.g., 0.125", 0.16" and 0.3"). These measurements are only illustrative, as it will be readily recognized by one having ordinary skill in the art that pushpin retaining device 2 can be made in various scales.

Figure 6:
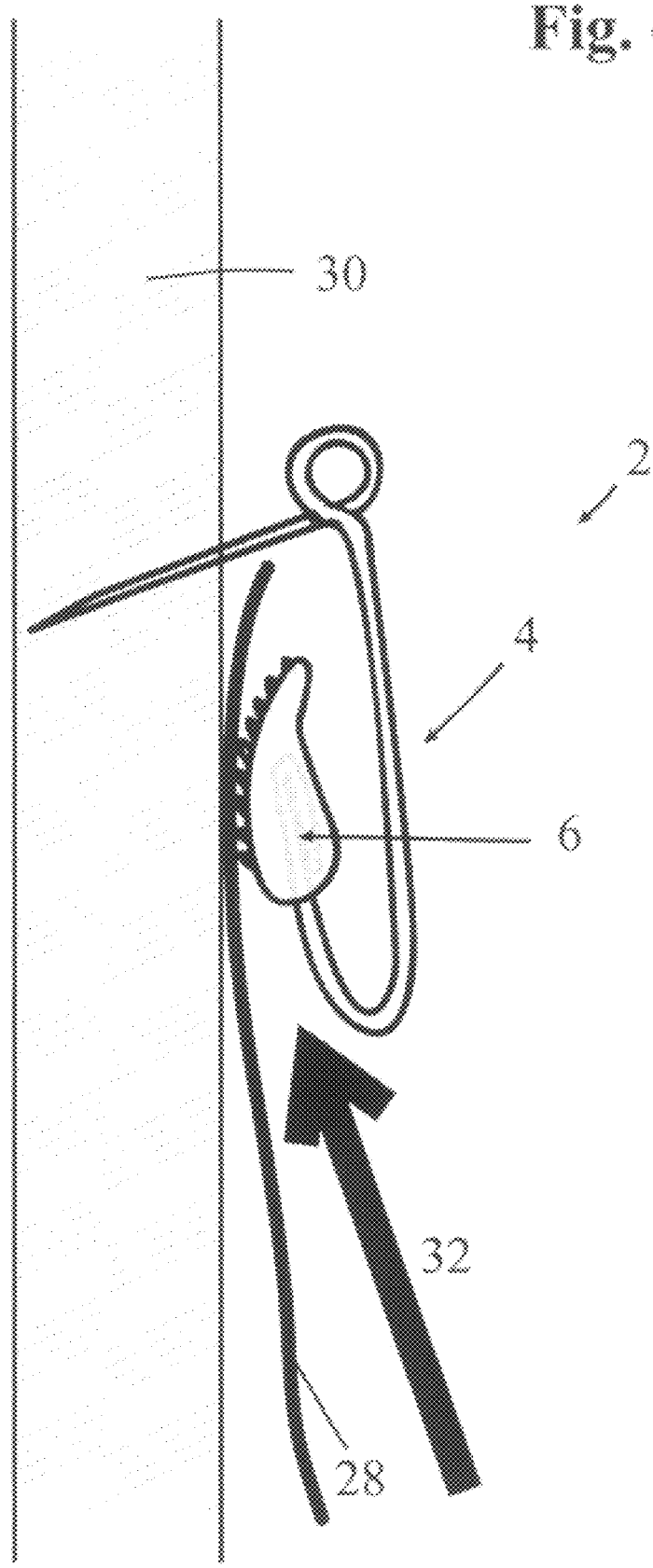
FIG. 6 is a side view of an exemplary pushpin retaining device associated with a support surface and receiving an object.
Figure 7:
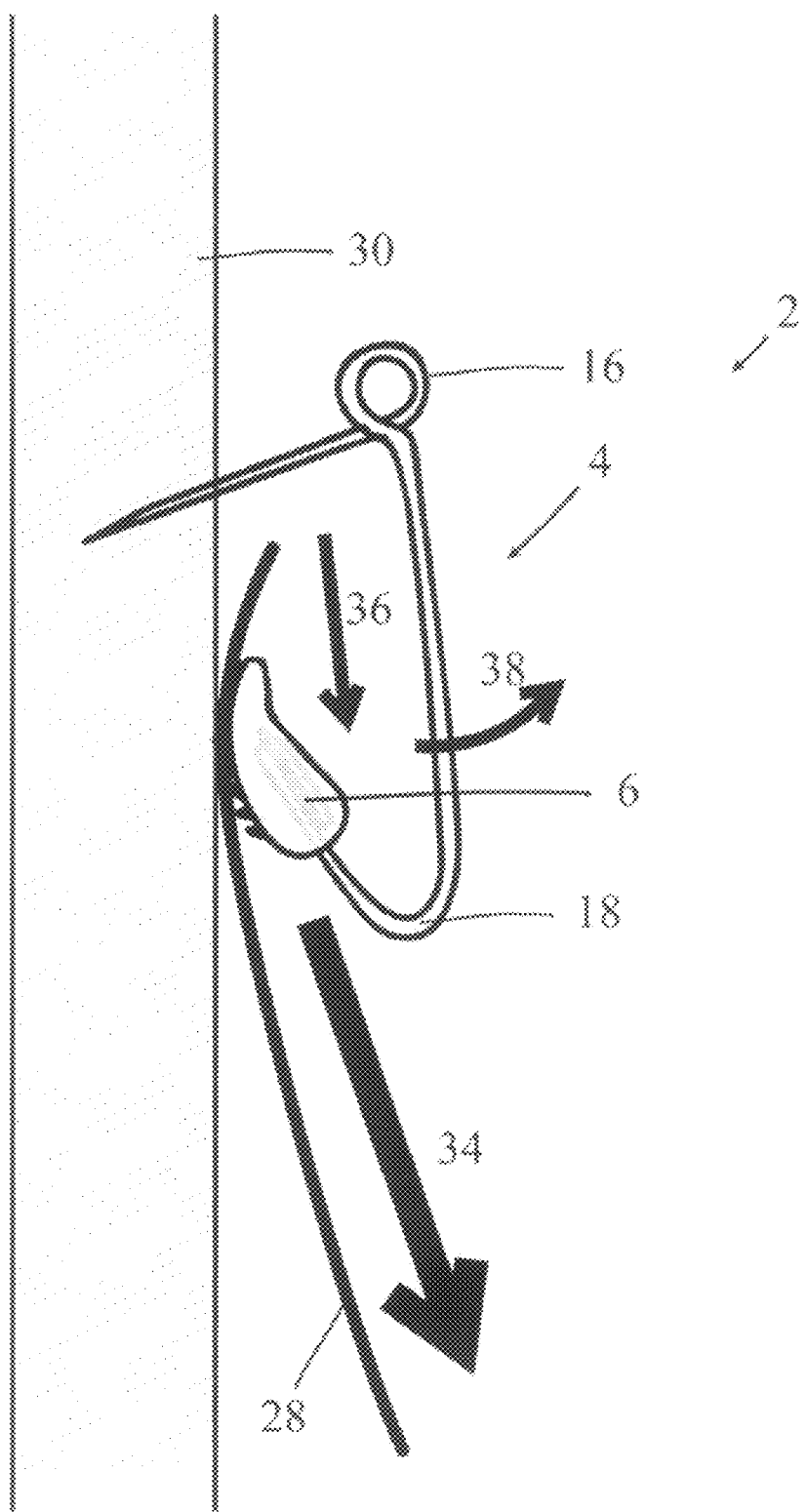
FIG. 7 is a side view of an exemplary pushpin retaining device associated with a support surface and retaining an object.

Referring again to FIGS. 1-5 and, in addition, referring to FIGS. 6 and 7 where pin 4 is shown in puncture engagement with vertical support surface 30, and grip foot 6 is shown receiving and retaining, respectively, planar object 28 against vertical support surface 30. Foot face 24 can be curved. Face 24 can also be deformable where less than all portions of face 24 can contact planar object 28 on vertical support surface 30 at a given time. Alternatively, singularly or in conjunction, face 24 can be curved so as to function as a rocker where less than all portions of face 24 can contact planar object 28 on vertical support surface 30 at a given time. Such contacting portions can predictably vary as different forces (e.g., forces 32 and 34) are applied to object 28 when in use. As such, contacting portions can deformably and/or rockerably engage a portion of object 28 when in use as conjunctively shown in FIGS. 6 and 7.

Grip foot 6, including face 24 with curvature, can be shaped and can be operatively associated with pin 6 so as to favor insertion of a portion of object 28 between face 24 of grip foot 6 and support surface 30 when in use. Conversely, grip foot 6, including face 24 with curvature, can be shaped and can be operatively associated with pin 6 so as to retain and resist removal of the same portion of object 28 by pulling forces 34 (e.g., gravitational forces) acted on object 28 when in use.

Referring particularly to FIG. 6, pushpin retaining device 2 of FIG. 1 is shown receiving planar object 28 against vertical support surface 30 in response to pushing force 32. Conversely, with particular reference to FIG. 7, pushpin retaining device 2 can retain planar object 28 against vertical support surface 30 despite pulling forces 34 (e.g., gravitational forces) that can be exerted on planar object 28. In response to pulling forces 34 that may be exerted on object 28, grip foot 6 can deform due to forces on grip foot 6 generally in direction 36. Deformation of grip foot 6 can cause an increase in surface area of face 24 contacting object 28. Such deformation can cause an increase in hold by grip foot 6 of object 28 against support surface 30. Also in response to pulling forces 34 that may be exerted on object 28, pin body 8 of pin 4 can deform outward generally in direction 38, which can cooperate with grip foot 6 in retaining object 28 against support surface 30 until failure, if any.

Figure 8:
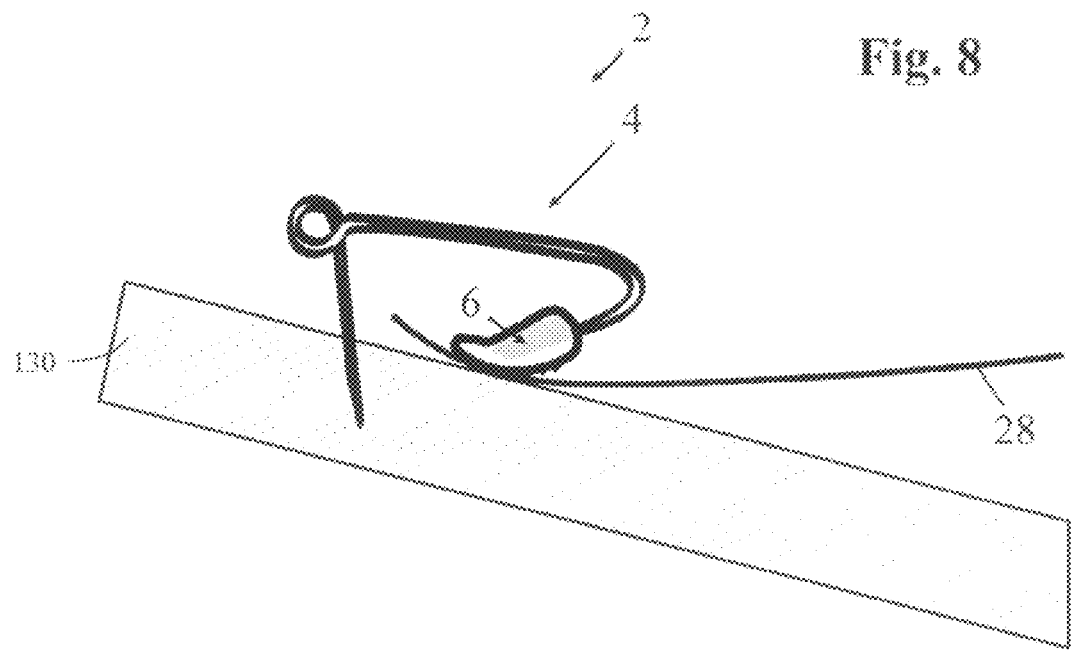
FIG. 8 is a side view of an exemplary pushpin retaining device associated with another support surface and retaining an object.
Figure 9:
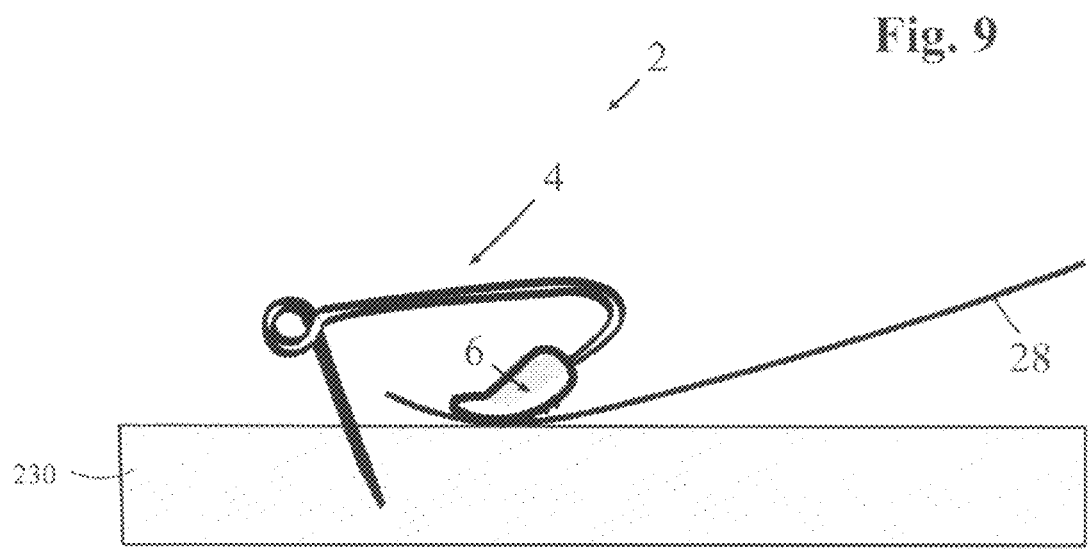
FIG. 9 is a side view of an exemplary pushpin retaining device associated with yet another support surface and retaining an object.

In reference to FIGS. 8 and 9, pushpin retaining device 2 is engaged with object 28 substantially as described above with reference to FIG. 7, as will be appreciated by one having ordinary skill in the art. A redundant description will not be repeated here. FIG. 8 illustrates that pushpin retaining device 2 may be used with angled support surface 130 without substantially changing the retaining means of pushpin retaining device 2 as described above. It can be noted here that at least some forces acting on pushpin retaining device 2 are likely to change in magnitude and/or direction, as will be appreciated by one having ordinary skill in the art.

Similarly, FIG. 9 illustrates that pushpin retaining device 2 may be used with horizontal support surface 230 without substantially changing the retaining means of pushpin retaining device 2 as described above. It can be likewise noted here that at least some forces acting on pushpin retaining device 2 are likely to change in magnitude and/or direction, as will be appreciated by one having ordinary skill in the art.

Referring generally to FIGS. 10-14, the exemplary pushpin retaining devices shown are similar to pushpin retaining device 2 of FIG. 1 in construction except as may be shown and discussed below. In fact, the exemplary pushpin retaining devices can function identically in all material aspects as pushpin retaining device 2 unless otherwise indicated.

Figure 10:
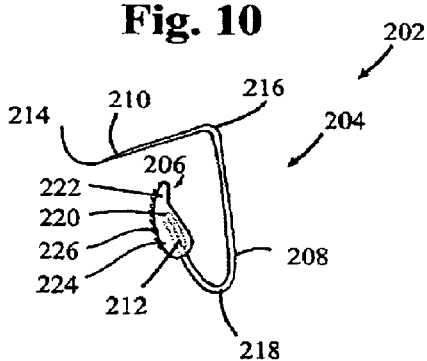
FIG. 10 is a side view of another exemplary pushpin retaining device.

Referring particularly to FIG. 10, another pushpin retaining device in accordance with at least one exemplary embodiment is shown. Similar to pushpin retaining device 2 of FIG. 1, pushpin retaining device 202 can include pin 204, grip foot 206, pin body 208, first end portion 210, second end portion 212, puncture tip 214, bend 218, securing loop 220, foot body 222, foot face 224 and textured surface 226. Pushpin retaining device 202 can have bend 216 as opposed to spring loop 16 of pushpin retaining device 2. Bend 216 may not form a protruded finger grip as can be formed by spring loop 16. Nevertheless, a user may find it comfortable to hold and manipulate pushpin retaining device 202 in a user's fingers proximate bend 216.

Figure 11:
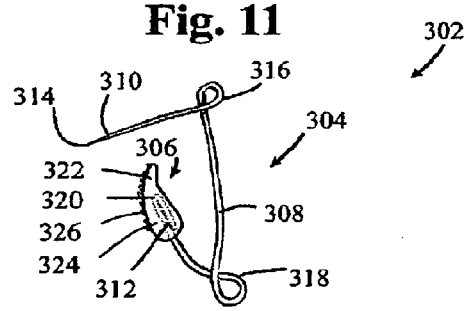
FIG. 11 is a side view of yet another exemplary pushpin retaining device.

Referring particularly to FIG. 11, pushpin retaining device 302 can include pin 304, grip foot 306, pin body 308, first end portion 310, second end portion 312, puncture tip 314, spring loop 316, securing loop 320, foot body 322, foot face 324 and textured surface 326. Pushpin retaining device 302 can have spring loop 316, which can be like spring loop 16 of pushpin retaining device 2. Pushpin retaining device 302 can have spring loop 318 as opposed to bend 18 of pushpin retaining device 2.

Figure 12:
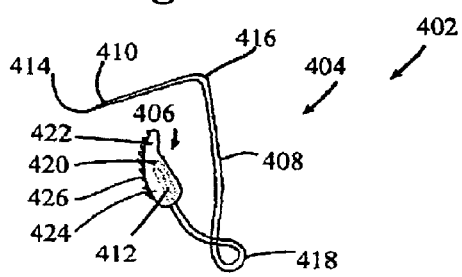
FIG. 12 is a side view of still another exemplary pushpin retaining device.

Referring particularly to FIG. 12, pushpin retaining device 402 can include pin 404, grip foot 406, pin body 408, first end portion 410, second end portion 412, puncture tip 414, securing loop 420, foot body 422, foot face 424 and textured surface 426. Interchangeably, pushpin retaining device 402 can have bend 416 as opposed to spring loop 16 of pushpin retaining device 2, and can conversely have spring loop 418 as opposed to bend 18.

Figure 13:
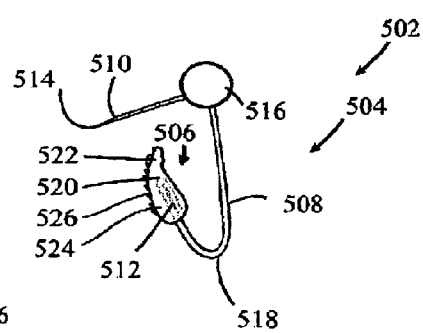
FIG. 13 is a side view of a further exemplary pushpin retaining device.

Referring particularly to FIG. 13, pushpin retaining device 502 can include pin 504, grip foot 506, pin body 508, first end portion 510, second end portion 512, puncture tip 514, bend 518, securing loop 520, foot body 522, foot face 524 and textured surface 526. Pushpin retaining device 502 can have piece 516 as opposed to spring loop 16 of pushpin retaining device 2. Piece 516 can be made of plastic and can be captured by pin 504. Piece 516 may be substantially circular. Piece 516 may provide a larger and more comfortable finger grip as compared to spring loop 16.

Figure 14:
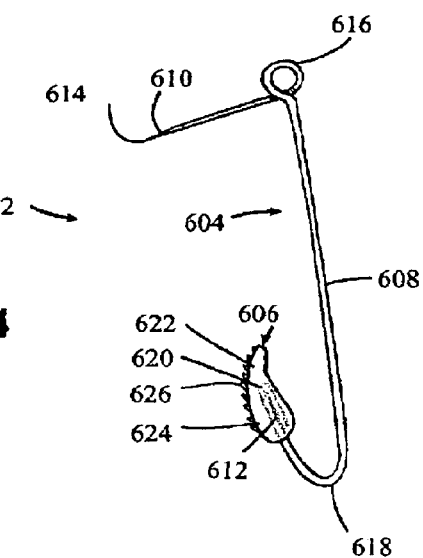
FIG. 14 is a side view of yet a further exemplary pushpin retaining device.

Referring particularly to FIG. 14, pin body 608 of pushpin retaining device 602 can be further elongated as compared to pin body 8 of pushpin retaining device 2. This is but one non-limiting example of the types of modifications to exemplary embodiments of the present invention that will be readily recognized by those having ordinary skill in the art having the benefit of this disclosure.

Figure 15:
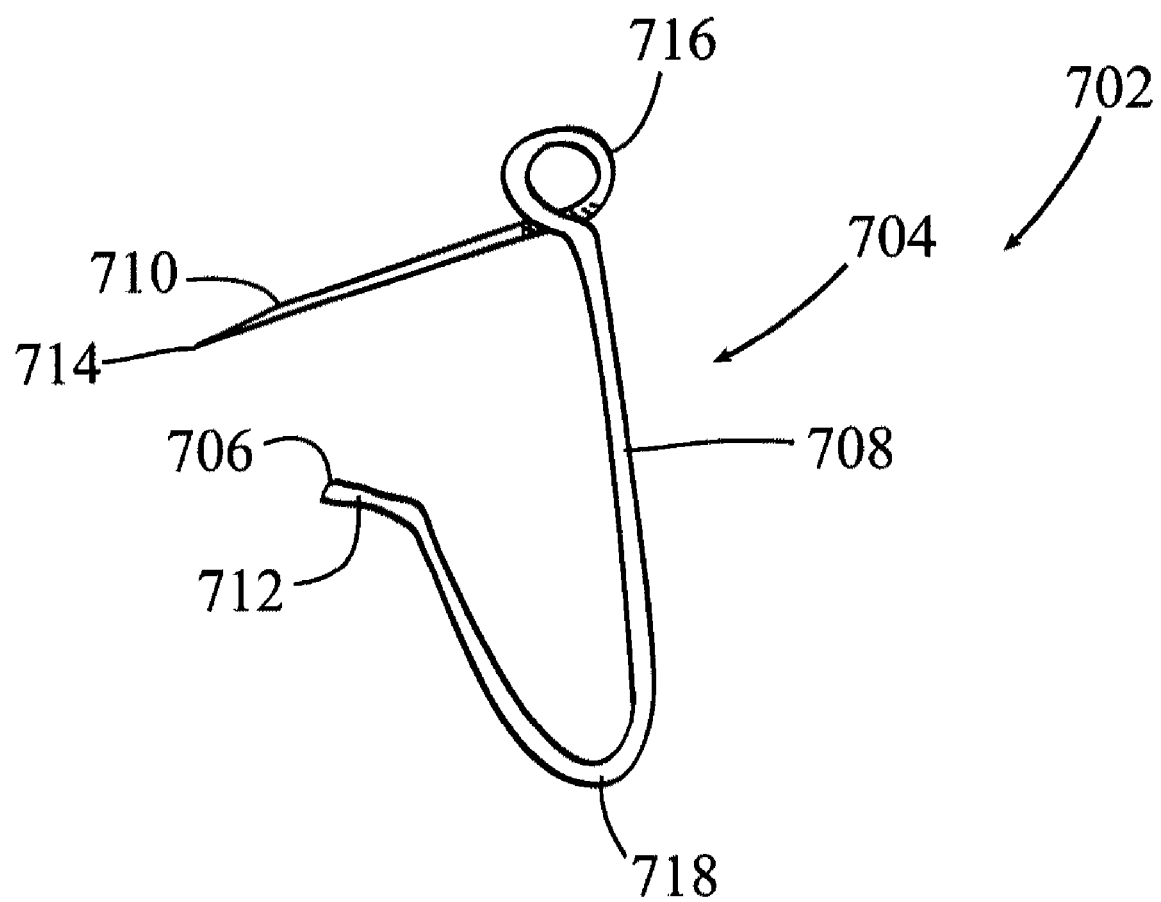
FIG. 15 is a side view of still a further exemplary pushpin retaining device.

Now referring to FIG. 15, a pushpin retaining device according to at least one other exemplary embodiment is shown. Similar to pushpin retaining device 2 of FIG. 1, pushpin retaining device 702 can include pin 704, pin body 708, first end portion 710, puncture tip 714, spring loop 716 and bend 718. At second end portion 712, pushpin retaining device 2 can have cut edge 706, which can be a contacting face for contacting a portion of an object or a support surface. Cut edge 706 can be angled, straight or curved. Cut edge 706 can have a non-textured or textured face for non-punctured engagement with an object or support surface. In at least one exemplary embodiment, a rubber or plastic covering (not shown) can be fitted over cut edge 706 to prevent damage to an object or support surface.

Figure 16:
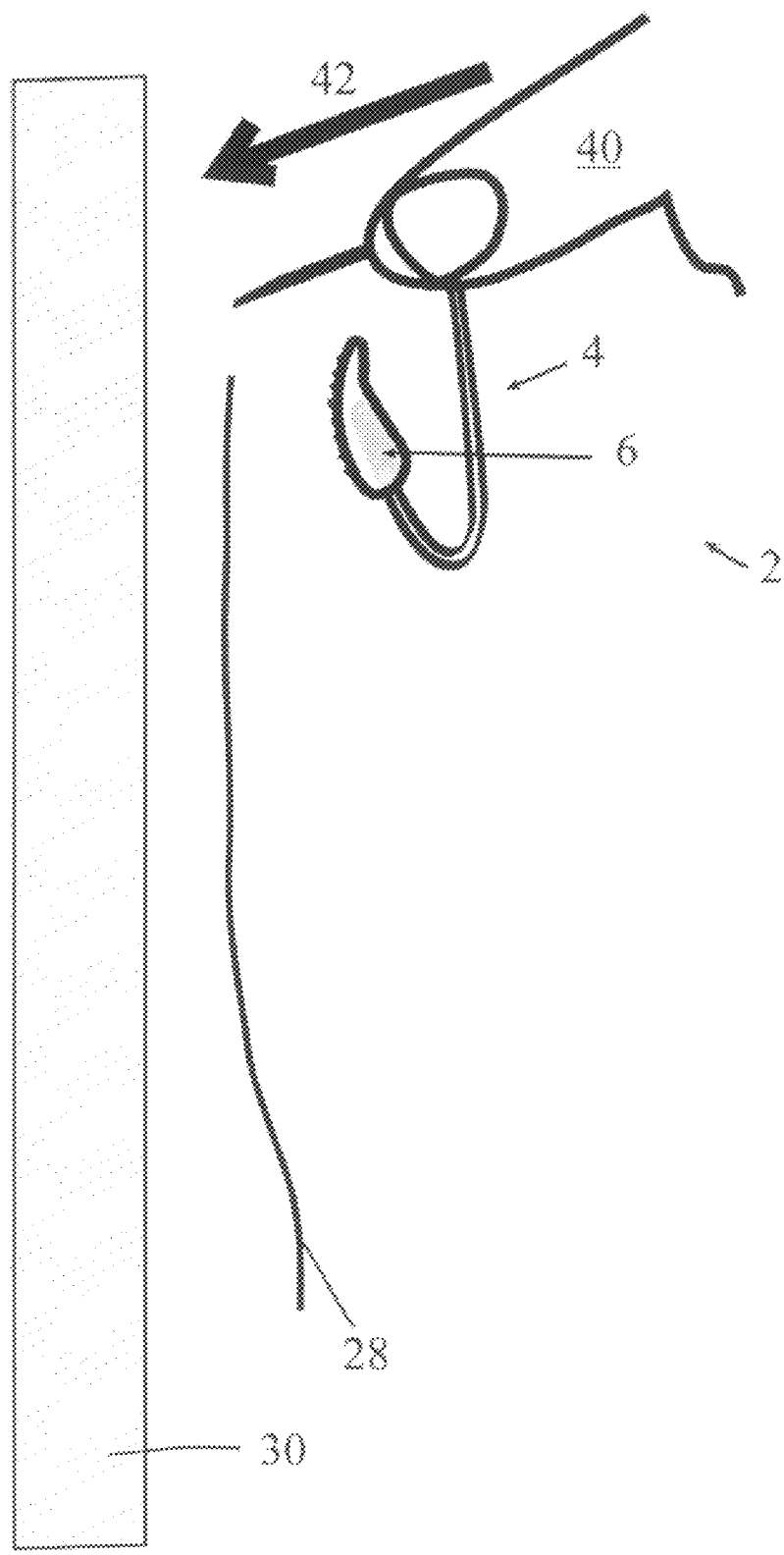
FIG. 16 is a side view of an exemplary pushpin retaining device being associated with a support surface and an object.
Figure 17:
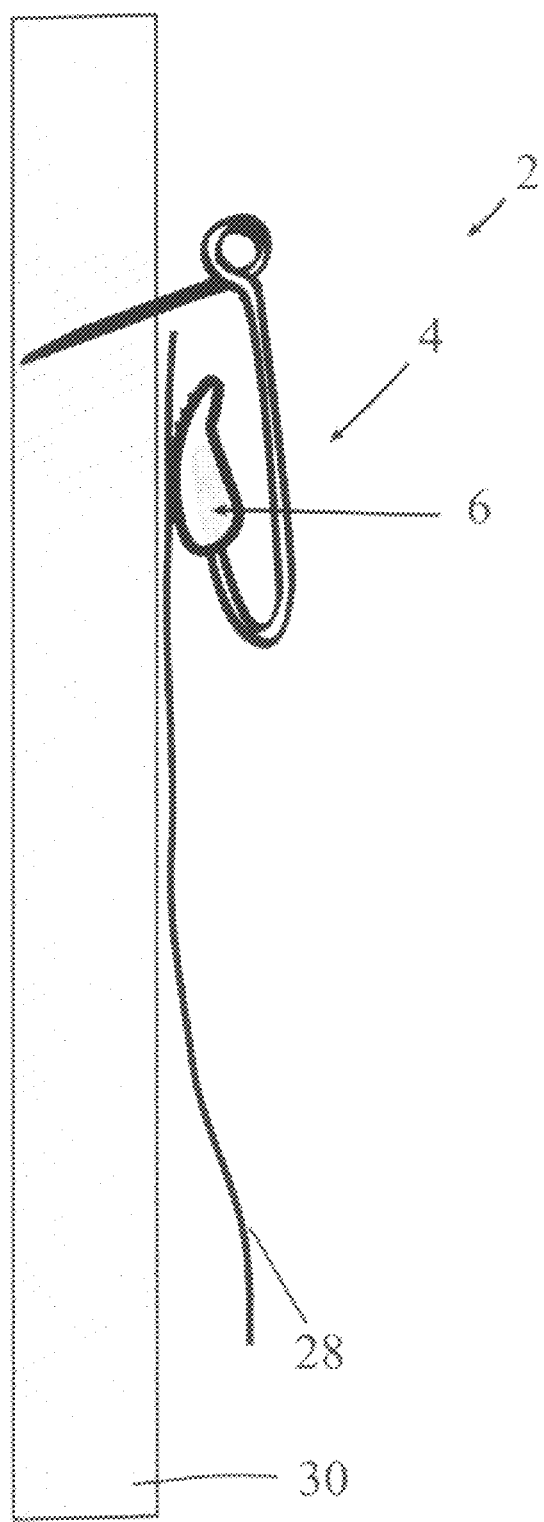
FIG. 17 is a side view of an exemplary pushpin retaining device associated with a support surface and retaining an object in a state of rest.

Referring generally to FIGS. 16-19, a method of retaining objects without object puncture is shown making use of exemplary pushpin retaining device 2 of FIG. 1. Referring to FIG. 16, a user can grasp pushpin retaining device 2 proximate spring loop 16 through the action of thumb 40 and another of a user's fingers (not shown). Thus, spring loop 16 can serve as a finger grasp. In order to retain object 28 against support structure 30, a user can puncture support structure 30 with pin 4 by moving pushpin retaining device 2 in direction 42 so as to pressably puncture support structure 30 with pin 4. Moreover, object 28 can be positioned between grip foot 6 and support surface 30 where grip foot 6 and support surface 30 can cooperate to pressably retain object 28 as shown in FIG. 17.

Turning to FIG. 17, pushpin retaining device 2 is in a rest position. Object 28 can be contacted by foot face 24 and urged against support surface 30 by grip foot 6 so as to retain object 28, under its own weight, against support surface 30 until sufficiently acted upon. Pushpin retaining device 2 can retain object 28 against support surface 30 by means of spring tension and mechanical advantage, which can result in pressure being place on a portion of object 28 by grip foot 6.

The amount of weight pushpin retaining device 2 can hold is dependent upon several factors, such as the size of pushpin retaining device 2, the construction of pushpin retaining device 2, the resiliency of pushpin retaining device 2, angle of first end portion 10 as it is engaged with support surface 30, the material of support surface 30, angle of grip foot 6 relative to object 28, depth pin 4 is inserted into support surface 30, coefficient of friction of support surface 30, coefficient of friction of object 28, coefficient of friction of grip foot 6 and the environment in which pushpin retaining device is employed, among others.

Figure 18:
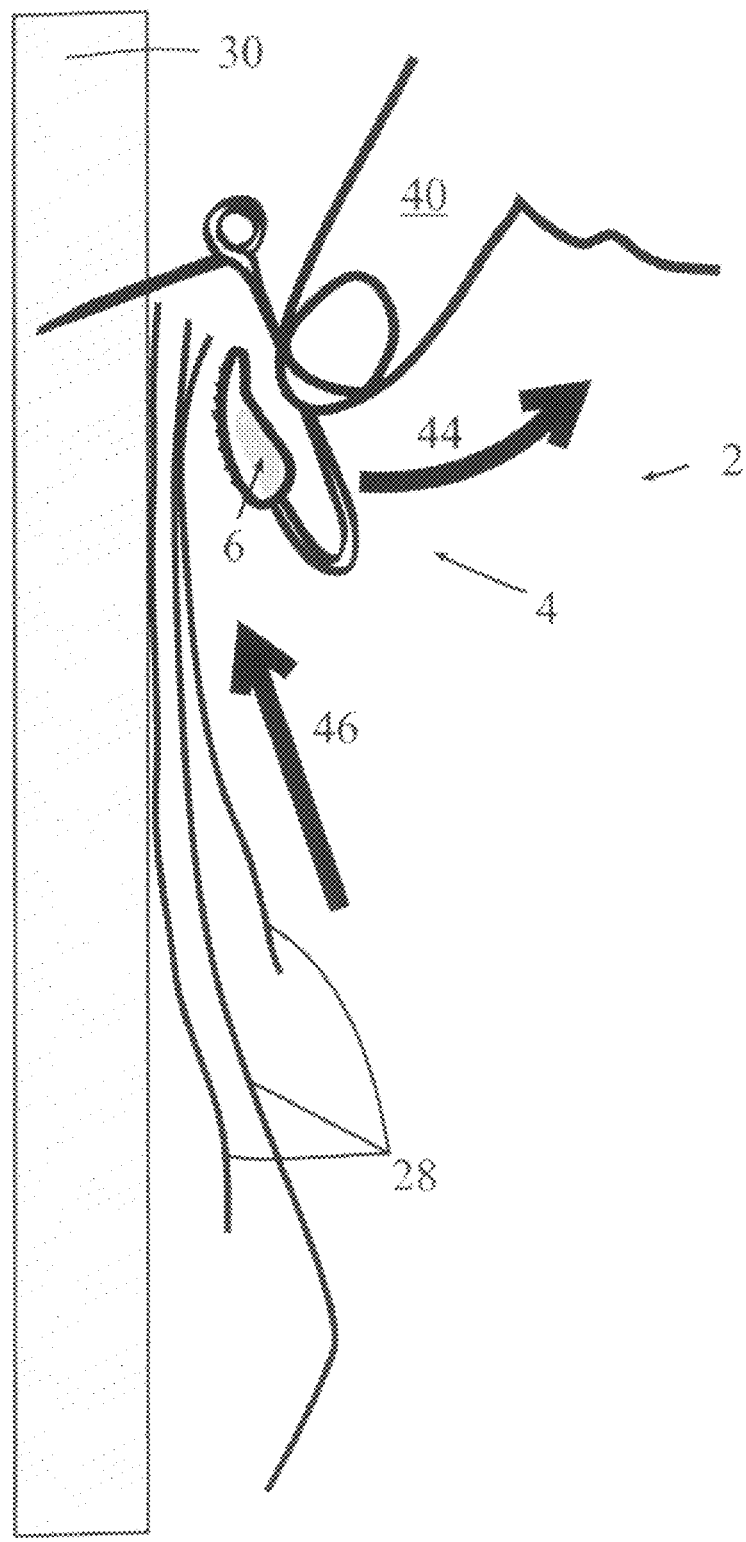
FIG. 18 is a side view of an exemplary pushpin retaining device associated with a support surface and positioned to receive additional objects.

Referring to FIG. 18, one or more objects 28 can be retained against support surface 30 by pushpin retaining device 2. In order to add additional objects 28 for retention by pushpin retaining device 2 in the rest position of FIG. 17, a user can use their thumb 40 to manually pry pushpin retaining device 2 in direction 44 from contact with first object 28. All objects 28 can be positioned between grip foot 6 by positioning and/or supporting objects 28 in direction 46 between grip foot 6 and support surface 30.

Figure 19:
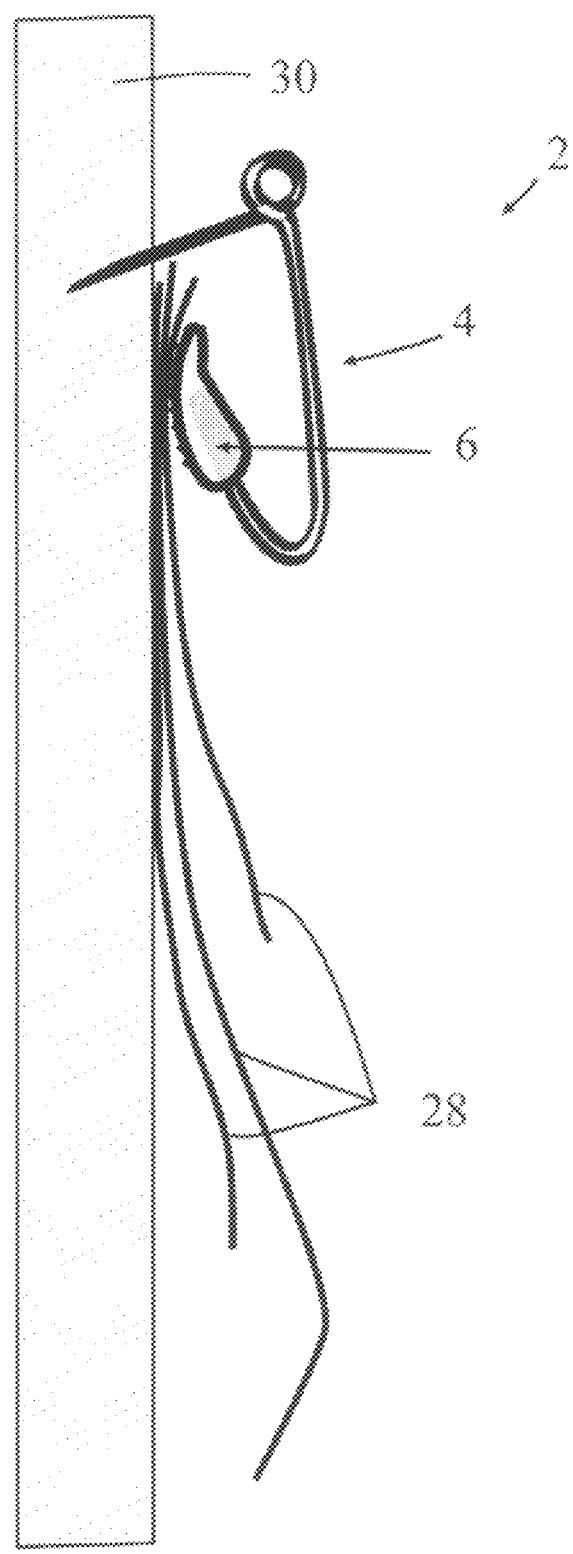
FIG. 19 is a side view of an exemplary pushpin retaining device associated with a support surface and retaining objects in a state of rest.

As shown in FIG. 19, pushpin retaining device 2 can be returned to a rest position. Objects 28 can be contacted by foot face 24 and urged against support surface 30 by grip foot 6 so as to retain objects 28 against support surface 30. Indeed, a plurality of planar objects 28 forming a plurality of layers can be trapped by grip foot 6. Grip foot 6 can rockerably and/or deformably resist any pulling forces on objects 28 such as gravitational forces.

Figure 20:
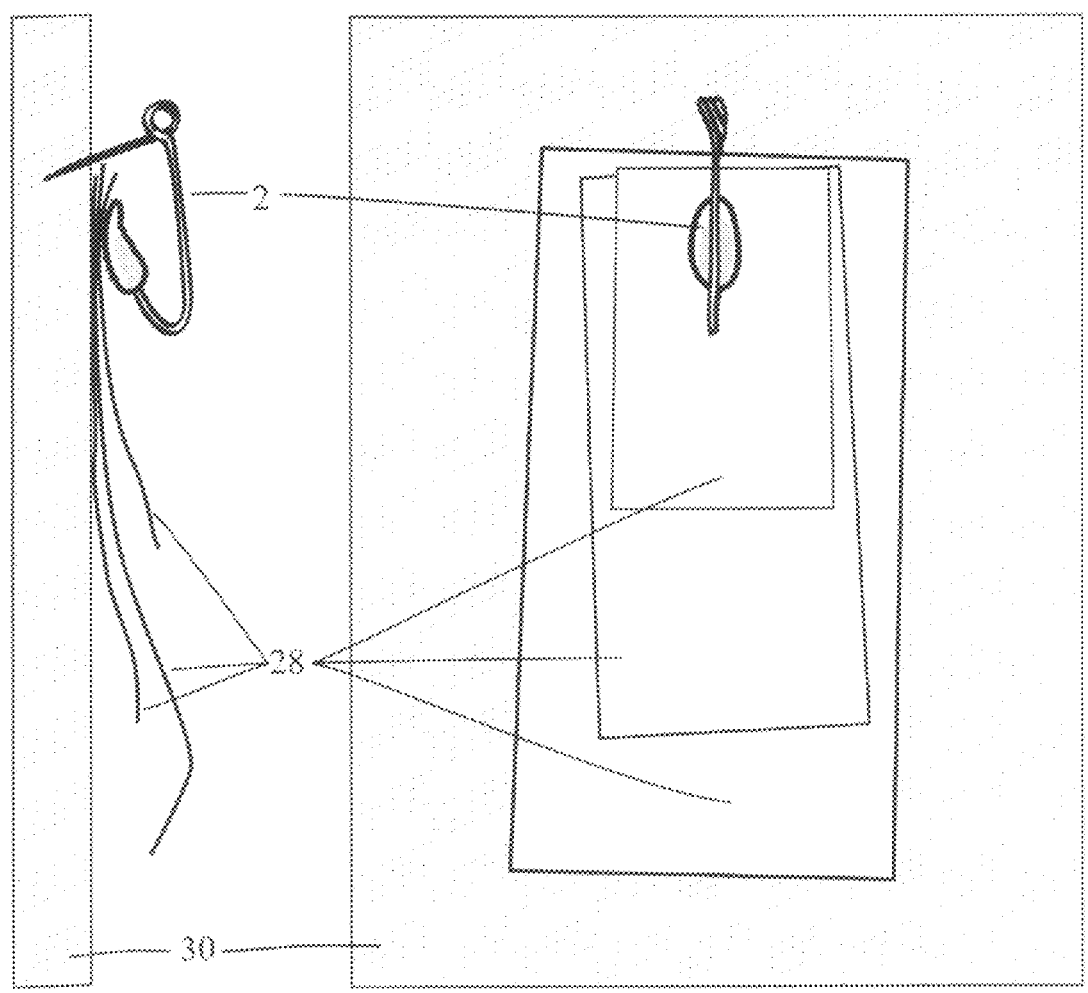
FIG. 20 is a split view of an exemplary pushpin retaining device associated with a support surface and retaining objects in a retaining configuration.

Referring generally to FIGS. 20-24, exemplary pushpin retaining device 2 of FIG. 1 is shown positioned in exemplary retaining configurations with support surface 30. Referring to FIG. 20, pushpin retaining device is shown in the configuration of FIG. 17. As shown, a plurality of planar objects 28 of differing sizes can be retained against support surface 30 by pushpin retaining device 2.

Figure 21:
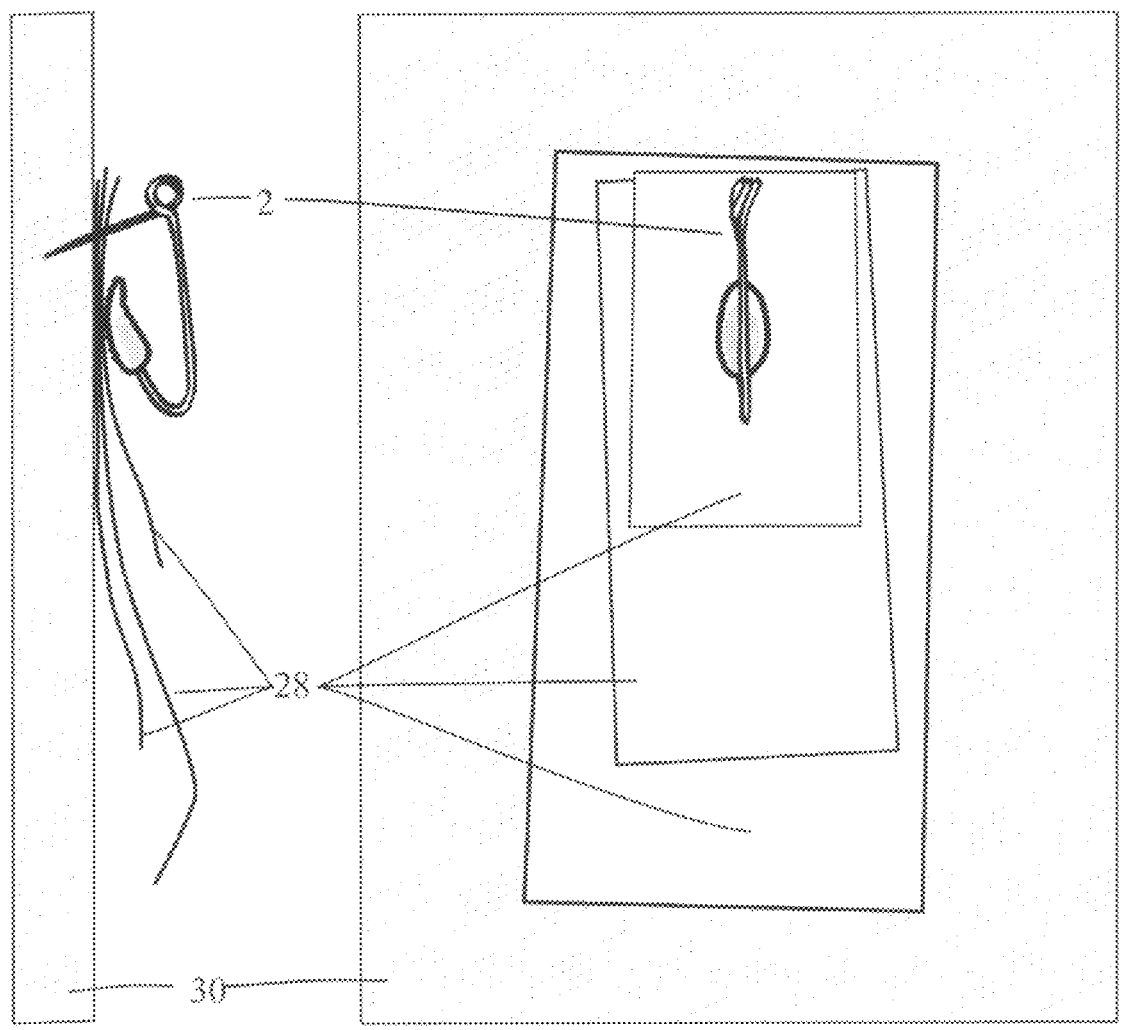
FIG. 21 is a split view of an exemplary pushpin retaining device associated with a support surface and retaining objects in another retaining configuration.

Referring to FIG. 21, exemplary pushpin retaining device 2 can be positioned so that pin 4 punctures objects 28 while grip foot 6 adds additional retaining force by pressing objects 28 against support surface 30. Puncturing objects 28 with pin 4 can add additional retaining force as opposed to puncturing support surface 30 outside the bounds of objects 28. This configuration may be adopted if the configuration of FIG. 20 is likely to fail, as one non-limiting example.

Figure 22:
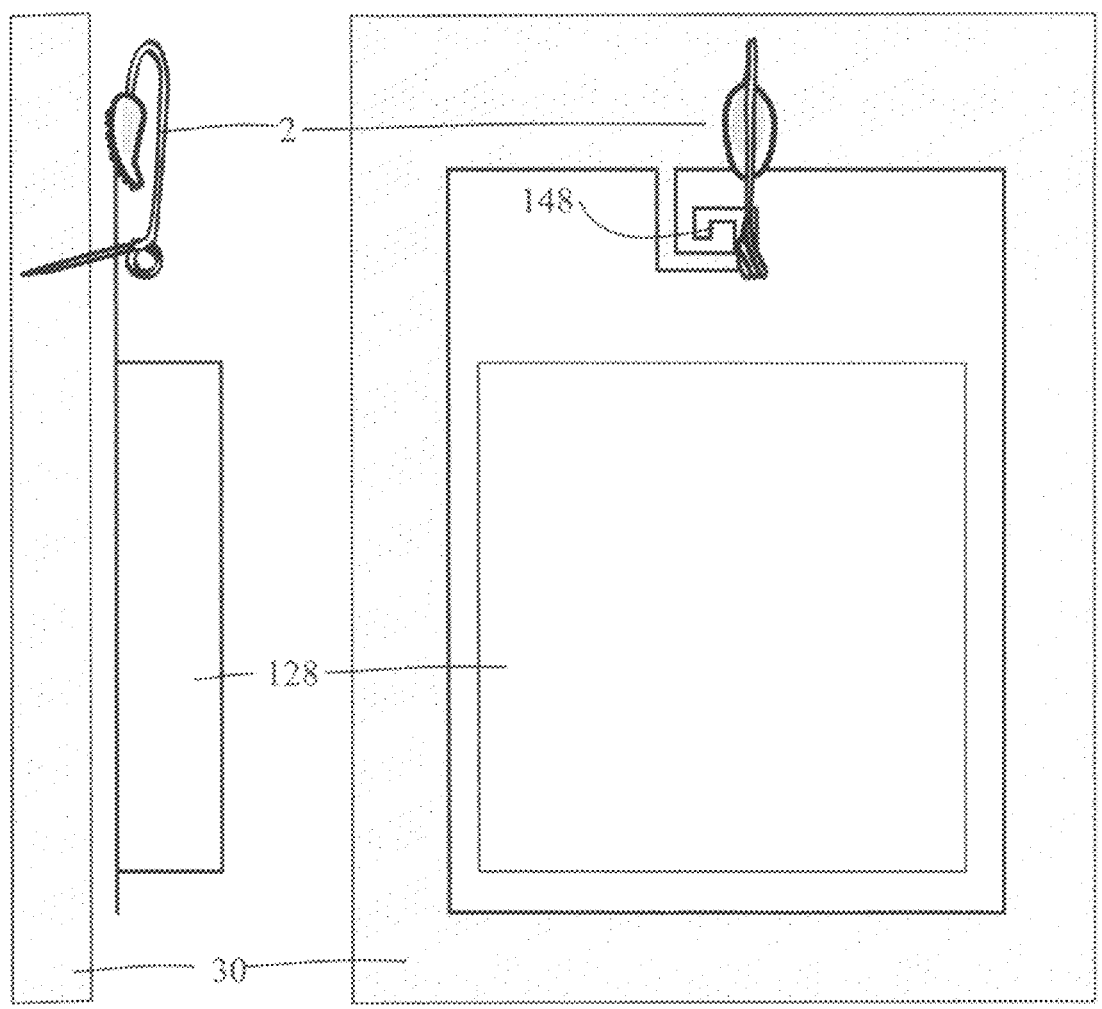
FIG. 22 is a split view of an exemplary pushpin retaining device associated with a support surface and retaining an object with a hanger in an inverted retaining configuration.

Referring to FIG. 22, exemplary pushpin retaining device 2 can be on support surface 30 in an inverted configuration such that grip foot 6 can be above spring loop 16. In such configuration, object 128 having hanger 148 can be retained by pushpin retaining device 2 against support surface 30. Hanger 148 can be a J-style hanging device. Hanger 148 can be associated with pushpin retaining device 2 between first end portion 10 and spring loop 16.

Figure 23:
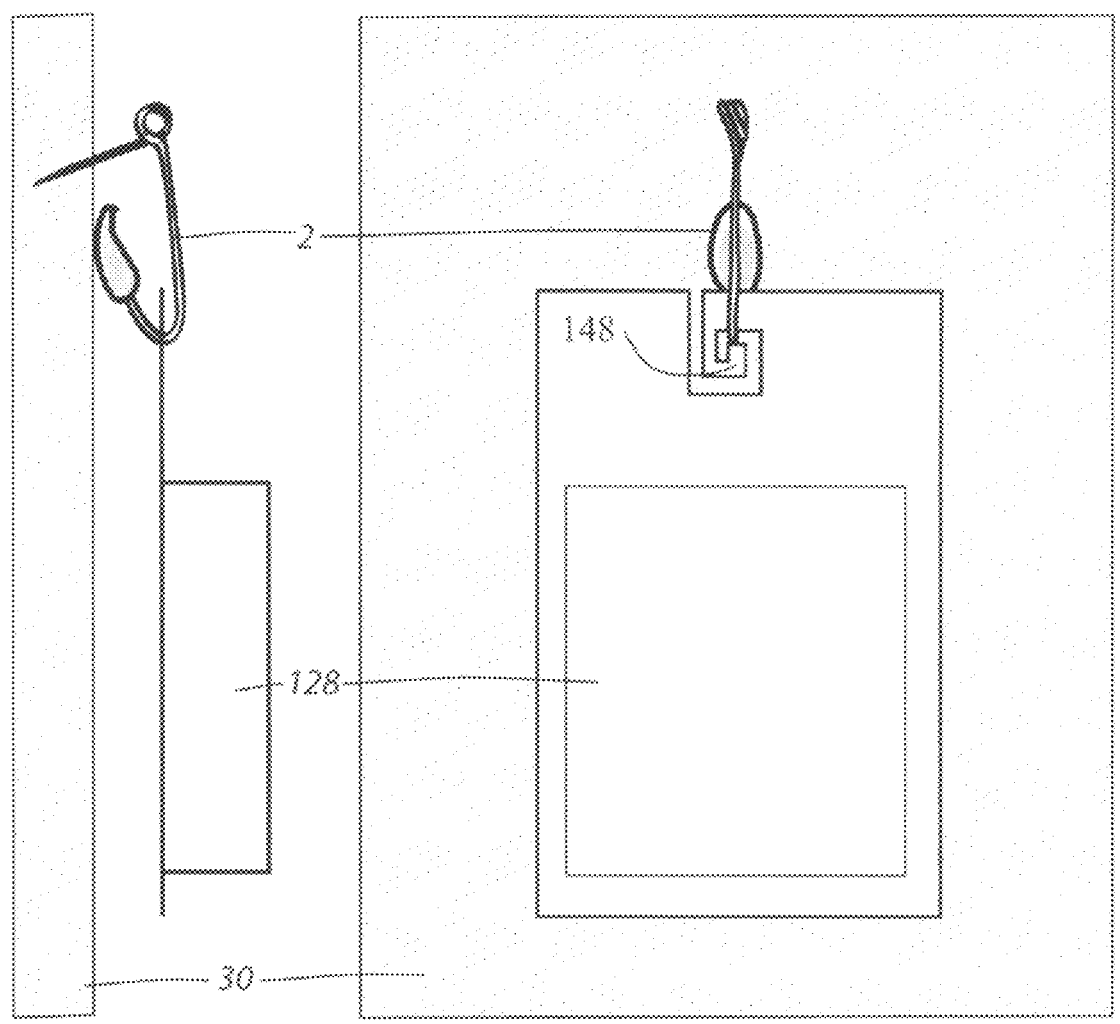
FIG. 23 is a split view of an exemplary pushpin retaining device associated with a support surface and retaining an object with a hanger in a non-inverted retaining configuration.

Referring to FIG. 23, exemplary pushpin retaining device 2 can be on support surface 30 in a non-inverted configuration and yet may still retain object 128 having hanger 148 against support surface 30. Hanger 148 can be associated with pushpin retaining device 2 proximate bend 18.

Figure 24:
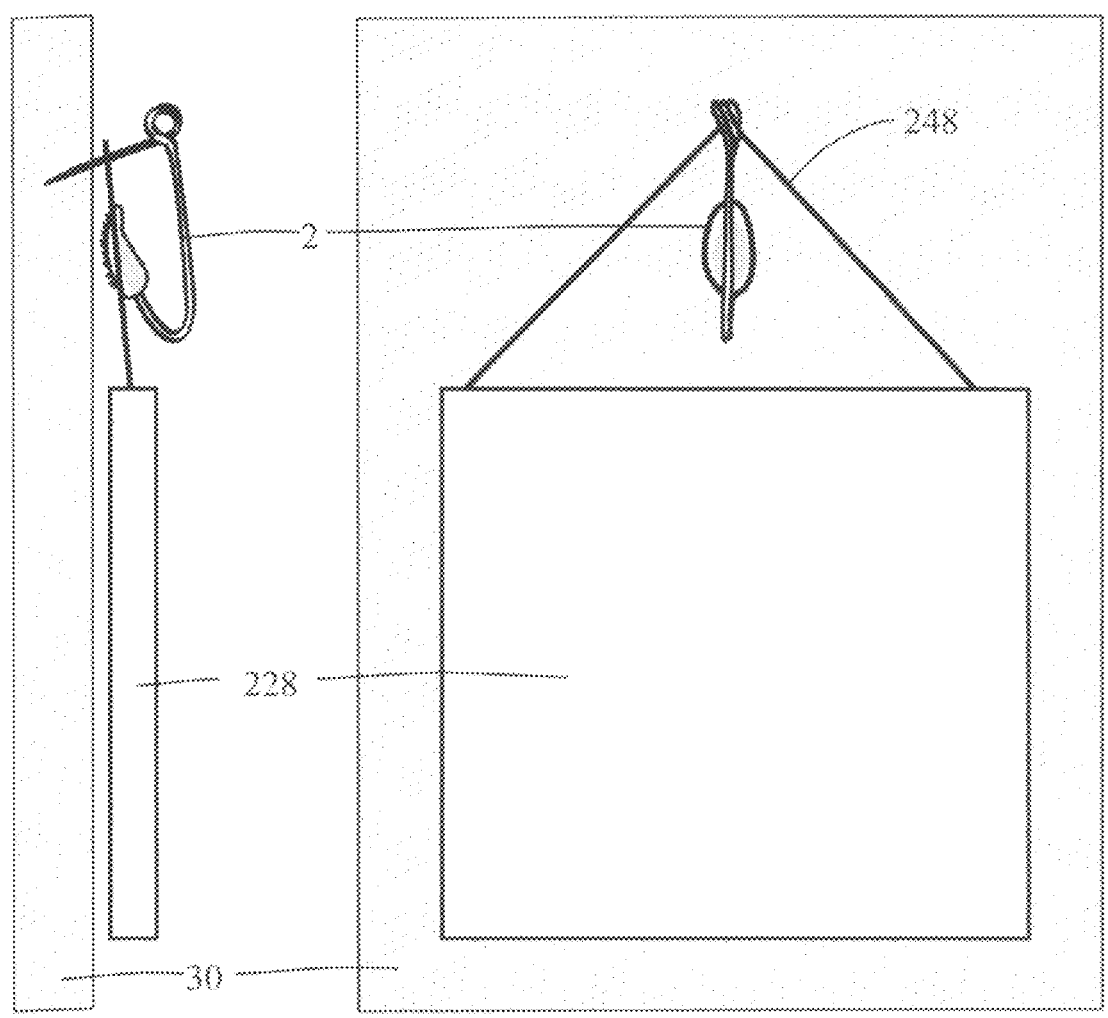
FIG. 24 is a split view of an exemplary pushpin retaining device associated with a support surface and retaining an object with a hanging line.

Referring to FIG. 24, exemplary pushpin retaining device 2 can retain object 228 having hanging line 248 against support surface 30. Hanging line 248 can be associated retaining device 2 between first end portion 10 and spring loop 16.

Figure 25:
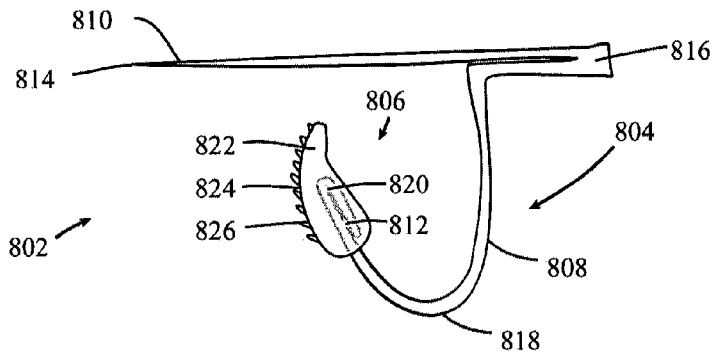
FIGS. 25-42 are side views of even further pushpin retaining device embodiments.

Referring to FIG. 25, another pushpin retaining device in accordance with at least one exemplary embodiment is shown. Pushpin retaining device 802 can include pin 804, grip foot 806, pin body 808, first end portion 810, second end portion 812, puncture tip 814, blow accepter 816, bend 818, securing loop 820, foot body 822, foot face 824 and textured surface 826. Blow acceptor 816 can act to receive blows from an instrument, such as a hammer or mallet. A strike to blow acceptor 816 can drive first end portion 810 into a puncturable surface. The portion of pin body 808 leading from blow acceptor 816 to first end portion 810 can resemble a conventional nail in construction. Thus, surfaces puncturable by a conventional nail may be puncturable by pushpin retaining device 802.

Figure 26:
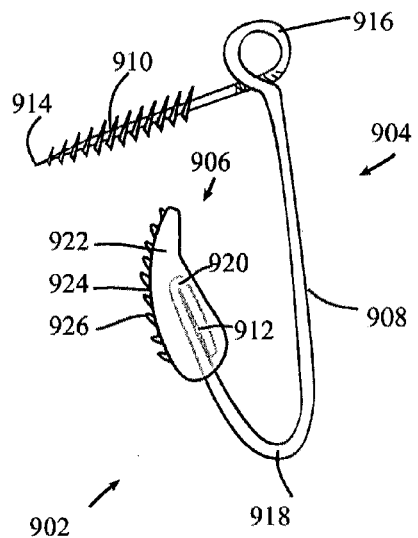

Referring to FIG. 26, yet another pushpin retaining device in accordance with at least one exemplary embodiment is shown. Pushpin retaining device 902 can include pin 904, grip foot 906, pin body 908, first end portion 910, second end portion 912, puncture tip 914, spring loop 916, bend 918, securing loop 920, foot body 922, foot face 924 and textured surface 926. First end portion 910, as well as a portion(s) of pin body 908, can be threaded similar to a conventional screw. Thus, surfaces puncturable by a conventional screw may be puncturable by pushpin retaining device 902.

Figure 27:
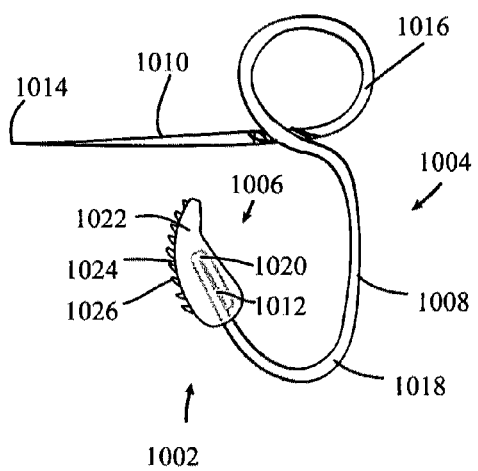
Figure 28:
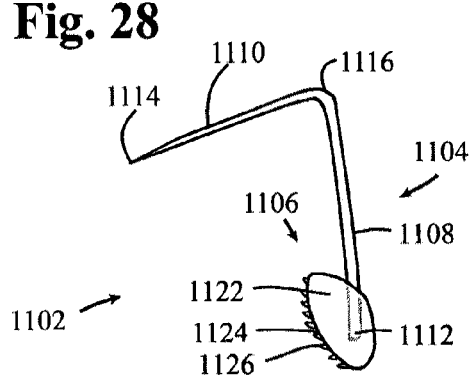

Referring to FIG. 27, still another pushpin retaining device in accordance with at least on exemplary embodiment is shown. Pushpin retaining device 1002 can include pin 1004, grip foot 1006, pin body 1008, first end portion 1010, second end portion 1012, puncture tip 1014, spring loop 1016, bend 1018, securing loop 1020, foot body 1022, foot face 1024 and textured surface 1026. Spring loop 1016 can be larger than spring loop 16 of FIG. 1. A larger spring loop 1016 can serve as a larger finger grip. A larger finger grip may aid a user in puncturing a surface with pushpin retaining device 1002. For example, a larger spring loop 1016 can aid in puncturing a drywall surface with pushpin retaining device 1002.

Figure 29:
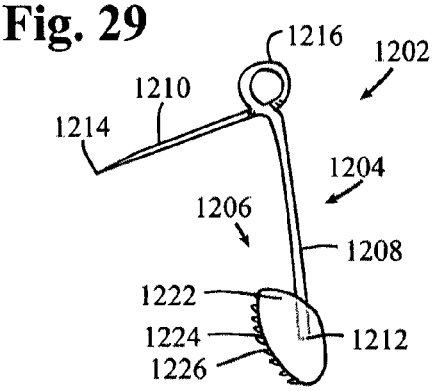
Figure 30:
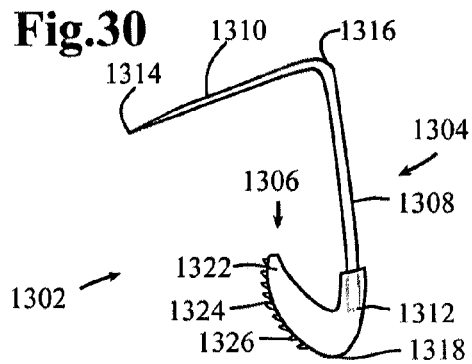
Figure 31:
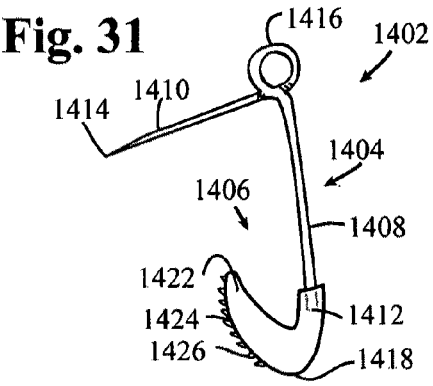
Figure 32:
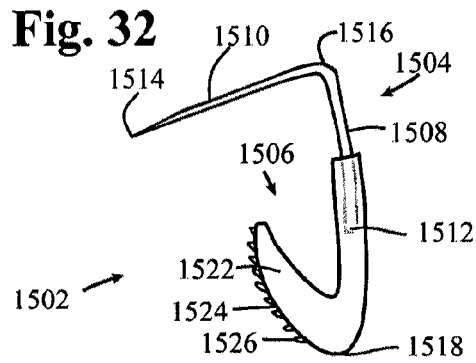
Figure 33:
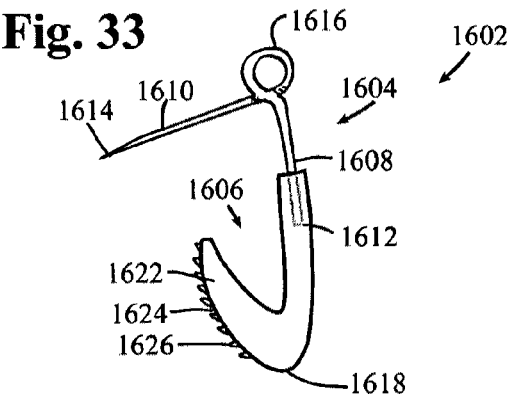
Figure 34:
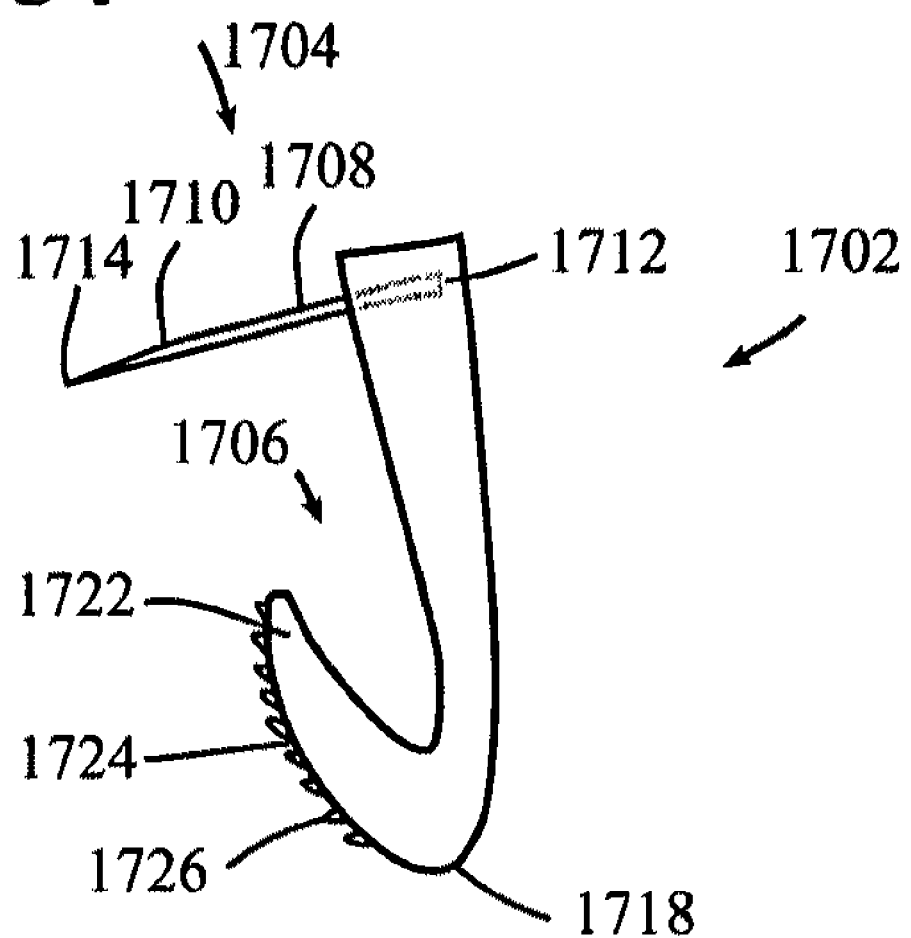
Figure 35:
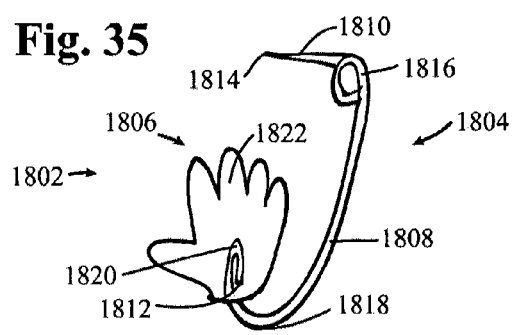
Figure 36:
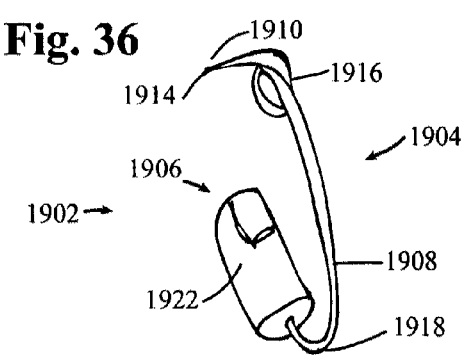
Figure 37:
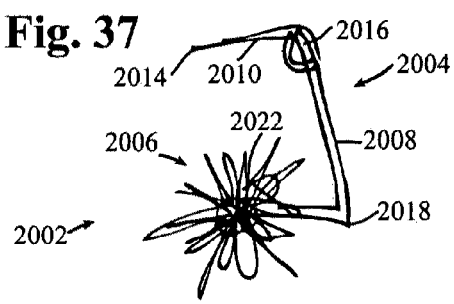
Figure 38:
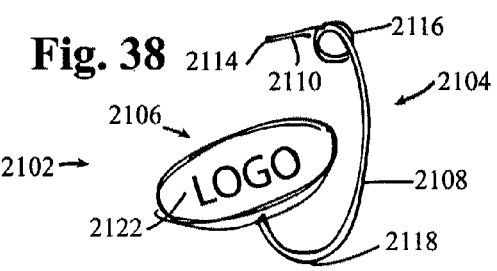
Figure 39:
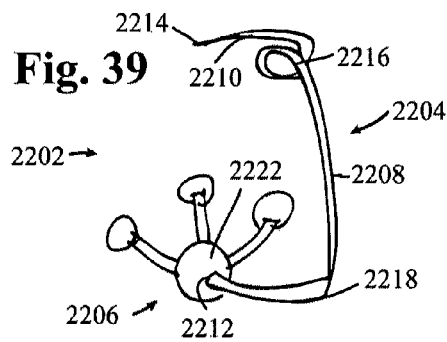
Figure 40:
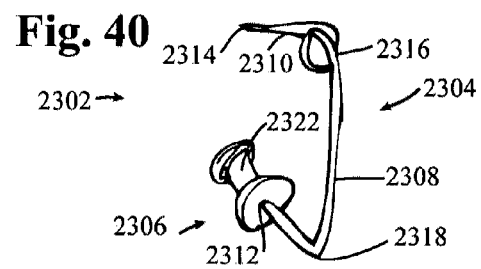

Referring to FIGS. 28-34, further exemplary embodiments are shown. Pushpin retaining devices 1102, 1202, 1302, 1402, 1502, 1602, 1702 can respectively include: pin 1104, 1204, 1304, 1404, 1504, 1604, 1704; grip foot 1106, 1206, 1306, 1406, 1506, 1606, 1706; pin body 1108, 1208, 1308, 1408, 1508, 1608, 1708; first end portion 1110, 1210, 1310, 1410, 1510, 1610, 1710; second end portion 1112, 1212, 1312, 1412, 1512, 1612, 1712; puncture tip 1114, 1214, 1314, 1414, 1514, 1614, 1714; foot body 1122, 1222, 1322, 1422, 1522, 1622, 1722; foot face 1124, 1224, 1324, 1424, 1524, 1624, 1724; and textured surface 1126, 1226, 1326, 1426, 1526, 1626, 1726, Referring particularly to FIG. 28, bend 1116 can be the only bend. Referring particularly to FIG. 29, spring loop 1216 can be present without further bending. Referring particularly to FIGS. 30-34, bend 1316, 1516 and spring loops 1416, 1616 can be present, respectively. Grip foots 1306, 1406, 1506, 1606 can be curved to include bends 1318, 1418, 1518, 1618, respectively. Referring particularly to FIG. 34, grip foot 1706 can include bend 1718, which can be the only bend as pin 1702 can be substantially linear.

Referring to FIGS. 35-42, even further exemplary embodiments are shown. Pushpin retaining devices 1802, 1902, 2002, 2102, 2202, 2302, 2402, 2502 can have grip foots 1806, 1906, 2006, 2106, 2206, 2306, 2406, 2506, respectively. Pushpin retaining devices 1802, 1902, 2002, 2102, 2202, 2302, 2402, 2502 can also respectively include: pin 1804, 1904, 2004, 2104, 2204, 2304, 2404, 2504; pin body 1808, 1908, 2008, 2108, 2208, 2308, 2408, 2508; first end portion 1810, 1910, 2010, 2110, 2210, 2310, 2410, 2510; puncture tip 1814, 1914, 2014, 2114, 2214, 2314, 2414, 2514; spring loop 1816, 1916, 2016, 2116, 2216, 2316, 2416, 2516; bend 1818, 1918, 2018, 2118, 2218, 2318, 2418, 2518; and foot body 1822, 1922, 2022, 2122, 2222, 2322, 2422, 2522. Second end portions (e.g., 1812, 2212, 2312, 2412) and securing loops (e.g., 1820) may also be respectively present in such embodiments.

Figure 41:
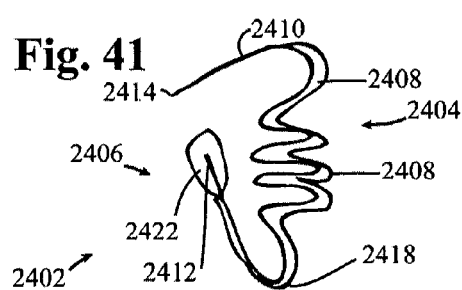
Figure 42:
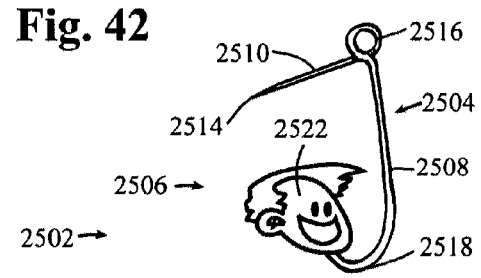

Still referring to FIGS. 35-42, in general, grip foots can be made in numerous shapes. It can be made in widths ranging from wide to narrow. Grip foots can be designed and shaped to be comical, whimsical, aesthetically pleasing and/or commercial in nature. As a few non-limiting examples, grip foots can be designed to represent and/or showcase a hand, a foot, fingers, animated characters or parts thereof, company/organizational logos and other source identifiers, etc. Moreover, one or more grip foots can be associated with a pin in at least one exemplary embodiment. Referring particularly to FIG. 41, pin body 2408 can also be designed and shaped to be comical, whimsical, aesthetically pleasing and/or commercial in nature.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A pushpin device for retaining objects, comprising:
a resilient, elongated pin having a pin body bounded by a first end portion and a second end portion, the first end portion-is pointed for puncturing, the second end portion having a securing loop;
the pin body having a bend between 40 degrees and 180 degrees, the degree of the bend measured from the orientation of a portion of the pin proximate the bend and distal the second end portion, the bend located between the second end portion and a midpoint of the pin body as measured end-to-end, the bend causing the pin body to curve back on itself;
the pin body having one or more spring loops located between the first end portion and a midpoint of the pin body as measured end-to-end, the spring force of the one or more spring loops acting to bias the second end portion toward the first end portion; and
a deformable grip foot operatively associated with the securing loop of the second end portion, the grip foot including a textured contacting face wherein the contacting face contacts a support surface or presses an object against a support surface and deformation of the grip foot increases surface area and increases hold by the grip foot, the grip foot having an elliptical surface area and an elliptical cross sectional area that is substantially larger than a surface area and a cross sectional area of the second end portion,
wherein the first end portion extends substantially past the one or more spring loops and substantially past the securing loop.

2. The pushpin device of claim 1 wherein the pin acts as a spring.

3. The pushpin device of claim 2 wherein the pin is made from one of a metal and a plastic.

4. The pushpin device of claim 1 wherein at least one of the one or more spring loops also serves as a finger grip.

* * * * *